June 29, 1965   A. WOBIG   3,191,862
THREE-WAY VALVE FOR HOT WATER HEATING INSTALLATIONS
Filed Dec. 20, 1962   2 Sheets-Sheet 1

Inventor
Alberto Wobig
By Stevens, Davis, Miller & Mosher
Attorneys

June 29, 1965 A. WOBIG 3,191,862
THREE-WAY VALVE FOR HOT WATER HEATING INSTALLATIONS
Filed Dec. 20, 1962 2 Sheets-Sheet 2

Inventor
Alberto Wobig
By Stevens, Davis, Miller & Mosher
Attorneys

United States Patent Office 3,191,862
Patented June 29, 1965

3,191,862
THREE-WAY VALVE FOR HOT WATER
HEATING INSTALLATIONS
Alberto Wobig, Am neuen Felde 19, Luneburg, Germany
Filed Dec. 20, 1962, Ser. No. 246,162
Claims priority, application Germany, Dec. 20, 1961,
W 31,314
10 Claims. (Cl. 236—43)

The present invention relates to a three-way valve for heat exchanging elements of hot water heating installations, in which the valve casing has connections for a water feed line and a water drain line.

Multiway valves for heat exchanger elements of hot water heating installations are known by means of which a specific part of the water current circulating under the effect of gravity or by means of a circulating pump is fed to the heat exchanger element and the other part through a short circuit line in order to adapt with a predetermined water temperature the water throughput through the heat exchanger element to the heat exchanging process. Furthermore mixing valves are known which admix for the same purpose one part of the water coming out from the heat exchanger element to the water fed into the latter, in order to maintain in this way a specific water temperature in the heat exchanger element. The expression "heat exchanger element" of hot water heating installations shall mean in first line the radiators. The valves are suitable, however, also for the boilers and other heat exchanger elements, e.g. heaters for the hot water to be consumed.

The dimensioning of the short circuit lines and the total calculation of the hot water heating installation make necessary a considerable calculating expense if it shall be guaranteed that each radiator has a heating capacity adapted to the conditions of the room to be heated. If a greater number of radiators is connected in series behind each other in so called one-tube systems there arises besides a considerable additional expense because of the increase of the heating surface necessary for the radiators mounted behind the first one because of the cooling of the heating water. Because of the high adjustment forces necessary for the known valves a thermostatical control of each single radiator is possible only with great expense, e.g. making use of an adjusting motor or a hydraulic system. A sure adjustment with weak forces, e.g. by making use of bi-metal spirals is not possible up to now.

It is the object of the invention to provide a three-way valve for heat exchanger elements, particularly radiators, which make possible the construction of a hot water heating installation with considerable savings as compared with the usual systems.

It is a further object of the invention to configurate the three-way valve in such a manner that it is possible to connect it with one single connection to the heat exchanger element, whereby the mounting work is considerably facilitated. The valve body of the three-way valve shall be controllable by means of weak forces thermostically, so that each room receives the heating capacity which is individually adapted to it. The valve shall furthermore be useful for the boiler of the hot water installation with the similar advantages of a thermostatic control by the outer temperature. The valve is suitable particularly for so called one-tube heating installations in which always a greater number of radiators are mounted one behind the other.

In the enclosed drawings preferred embodiments of the object of the invention are shown.

Figure 1:
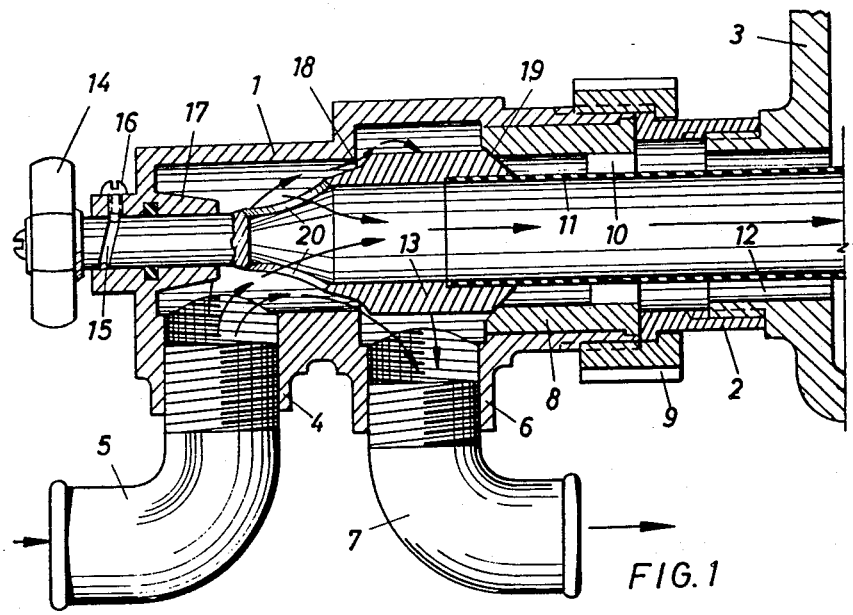
FIG. 1 shows a section through a first embodiment.
Figure 2:
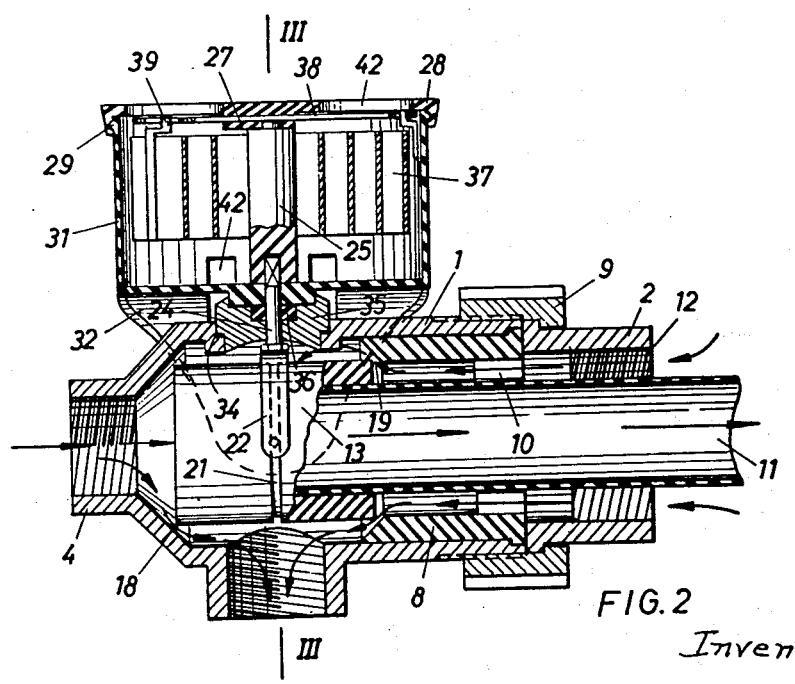
FIG. 2 shows a section through a thermostatically controlled embodiment.

In the embodiment according to the FIGURES 1 and 2 a valve casing 1 is provided with a connection for a heat exchanger 3, particularly for a radiator. Furthermore the valve casing 1 has a connection 4 communicating with a first section of the casing for a water feed line 5 and connection 6 communicating with a second section of the casing for a water drain line 7. In the case of a one-tube hot water heating installation the line 5 comes from the preceding radiator while the line 7 leads into the next radiator of the series. The hot water feed line 5 and the hot water drain line 7 are fed into the valve body 1 in an elbowed manner as is shown in the drawing. This presents the advantage that heat dilatations in these lines are automatically compensated at the elbowed spots without the necessity for any compensation loops.

The connection 2 is connected with the valve casing 1 by means of a cap screw 9. Into the valve casing 1 a sleeve 8 is introduced. The sleeve 8 has around its periphery three lug- or blade-shaped guide lugs 10 spaced by 120° from each other for a tube 11 which extends through the connection 2 into the heat exchanger element 3. The outer diameter of the tube 11 is considerably smaller, i.e. its surface is about half the size of the inner diameter of the connection 2. The tube 11 serves to feed the water into the heat exchanger element 3. The partial section 12 in form of an annular space arranged between the outer side of the tube 11 and the connection 2 serves for the re-circulation of the water from the heat exchanger element. If the heat exchanger element 3 is a usual ribbed radiator, the tube 11 extends over a rather long distance into the lower connection channel of the ribs. The water coming out from the front end of the tube 11 mounts upward in the ribs of the radiator, cools and sinks down again, so that it is drained out from the heat exchanger 3 through the partial section 12.

The tube 11 is inserted through a third section of the casing and into a hollow cylindrical valve body 13 which is axially shiftable within the valve casing 1, whereby it takes the tube 11 along with it. According to the embodiment as shown in FIGURE 1 a knob 14 is used for the axial shifting of the valve body 13, which knob effects the adjustment by means of a cam surface 15 and a stop pin 16. The guiding takes place within an extension 17 of the casing 1.

The valve body 13 has within the casing 1 for its end position a valve seat 18 and for its other end position a valve seat 19 on the sleeve 8. Besides the valve body 13 has several windows 20 on its front end.

If the valve body 13 has been shifted axially by the rotating of the knob 14 against this latter so that it engages the valve seat 18 in the casing 1, the water flows from the water feed line 5 through the windows 20 into the tube 11, through the radiator 3 to the partial section 12 and through the slot between the valve seat and the valve body 13 into the water drain line 7.

If by the rotation of the knob 14 the valve body 13 is shifted axially so far in the direction towards the radiator 3 that the valve body 13 engages its valve seat 19, the water re-circulation from the radiator 3 is blocked off. Thus no water can flow through the windows 20 and the tube 11 into the radiator 3. On the contrary all the water from the water feed line 5 flows through the channel between the valve body 13 and its valve seat 18 directly into the water drain line 7. In intermediate positions, in which the valve body 13 is between its two valve seats 18 and 19, one part of the water flows through the tube 11 and the radiator 3 while the other part flows directly from the water feed line 5 into the water drain line 7. As the section of the annular spaces between the valve seats 18 and 19 change continually with the rotation of the knob 14 also all the intermediate conditions may be adjusted. Thus the heating capacity of the radiator 3 is infinitely variable.

Figure 3:
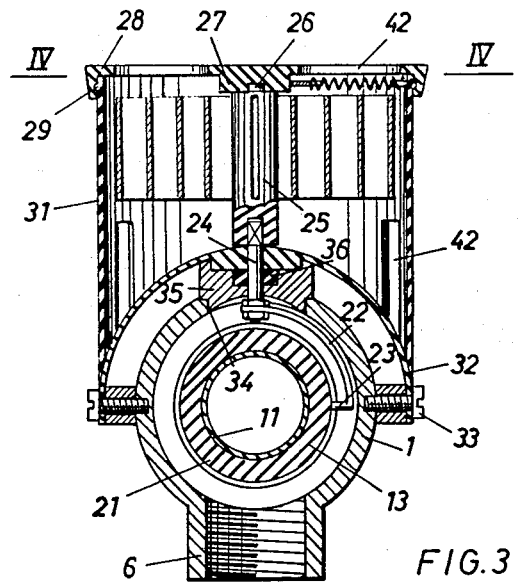
FIG. 3 shows a section along the line III—III of FIG. 2.
Figure 4:
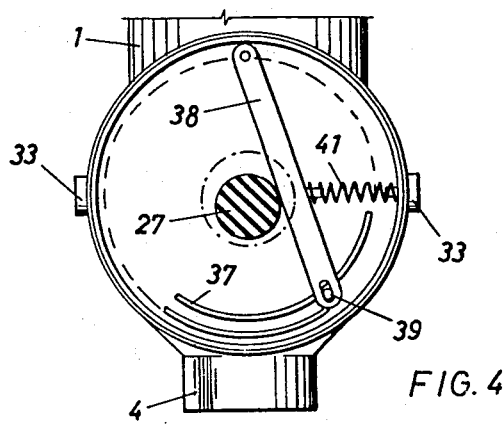
FIG. 4 shows a section along the line IV—IV of FIG. 3.

It is of particular importance that for the adjustment of the valve body 13 only very weak forces are necessary. The reason is that on both sides of the valve body 13 the same pressure prevails, i.e. it is neither necessary to work against the statical pressure of the hot water heating installation nor against the pump pressure. This makes possible a thermostatical control by means of bi-metal strips without any additional power sources, a situation which could not be reached up to now by any radiator valve. Such a thermostatic control is represented in the FIGURES 2 to 4.

In this embodiment the valve body 13 has an annular groove 21 into which engages a lever 22 with its elbowed extremity 23. The lever 22 is fastened on a pin 24 which engages by means of a nut shown square into an axle bolt 25. The upper front end of the axle bolt 25 is journaled rotatably at 26 in a bore of a cam 27. The cam 27 is fastened on a lid 28 which is held by means of a spring ring 29 on a thermostat casing 31. The thermostat-casing 31 has lugs 32 which are connected with the valve casing 1 by means of screws 33.

For the purpose of introducing the pins 24 the valve casing 1 has an opening 34 receiving a sleeve 35 in which the pin 24 is rotatably journaled. The sealing of the pin 24 against the atmosphere is effected by a gasket 36 which is carried in a recess of the sleeves 35.

A bi-metal spiral 37 is fixed with its inner extremity on the axle bolt 25. On the thermostat casing 31 a lever 38 is linked which engages the cam 27. The outer extremity of the bi-metal spiral 37 is fixed on an elbowed bolt 39 which engages into the lever 38. When rotating the lid 28 the lever 38 is pivoted by means of the cam 27 and thus the bi-metal spiral 37 is pre-loaded in the one or the other sense. In the lid 28 and in the casing 31 slots 42 are provided which assure a corresponding air circulation within the casing 31. The bi-metal spiral 37 thus responds to the air temperature. The lid 28 has a not shown graduation, so that by its rotation a desired room temperature can be adjusted. If the air temperature drops below the adjusted value, the bi-metal spiral 37 shifts by the pin 24 the plunger 11 in the direction towards the connection 4. Thus more water flows through the tube 11 into the radiator 3. The latter is thus better heated. If on account of this better heating the air temperature increases above the adjusted value the valve body 13 is moved by the bi-metal spiral 37 in the opposite sense. Then correspondingly more water flows from the connection 4 through the channel between the valve seat 18 and the valve body 13 to the connection 6. In the normal case the valve body will be in a central position between its two valve seats 18 and 19 and will be shifted by the bi-metal spiral according to the heat requirements, once somewhat in the one direction or in another case somewhat in the other direction.

The adjustment of the valve body 13 by means of the bi-metal spiral 37 is possible according to the invention, as on both sides of the valve body 13 there is the same statical pressure and the same pump pressure of the hot water heating installation, so that no pressure difference must be overcome. Merely the friction of the gasket 36 on the pin 24 must be overcome and this friction is small. According to the invention the valve body 13 and the tube 11 as well as the guide elements 10 are made of a heat-resistant plastic material. Thereby the friction is considerably diminished. Besides corrosions are avoided which could have the consequence of an increase of the friction. Furthermore it is guaranteed by the low weight that relatively small inert masses must be moved.

Preferably the thermostat casing 31 and the axle bolt 25 are made of plastic material in order to keep heat conductions as small as possible.

The thermostatically adjusted embodiment of the three-way valve has the particular advantage for radiators of one-tube hot water heating installations that an increase of the heating surfaces of the radiators between the first one is necessary or not to the extent as was usual up to now. If the room in which the first radiator is mounted has reached the adjusted temperature the valve body 13 closes the further admission of hot water to this radiator, i.e. the hot water flows directly from the hot water feed line 5 into the hot water drain line 7 to the radiators mounted in the next rooms. These thus do not receive already cooled water, but water having its full temperature, so that insofar the radiators may be dimensioned to this maximum temperature with corresponding savings of the heating surface. The same applies for all the other succeeding radiators. After a certain time of operation it is guaranteed that each room has the desired and adjusted temperature. The lever 38 is pressed onto the cam 27 by means of a spring 41. Instead of the spring 41 it is, of course, possible to use also any other elastic means.

I claim:

1. A control valve for heat exchanging systems or the like, comprising a valve case having a chamber with a first, a second and a third section, said case being provided with an inlet port, an outlet port and a junction port, said inlet port communicating with said first section, said outlet port communicating with said second section, and said junction port communicating with said third section and adapted to communicate with said heat exchange system, a valve member having a first and a second peripheral sealing surface and being axially movable with respect to the main axis of said case within said second section, said second section having an inner diameter larger than the outer diameter of said valve member and thus surrounding said valve member with an annular hollow space, said second section being defined by a third and a fourth sealing surface, said third and said fourth sealing surfaces corresponding with said first and second sealing surfaces, respectively, the distance between said third and said fourth sealing surfaces somewhat exceeding the distance between said first and second sealing surfaces, means for varying the position of said valve member parallel to said main axis of said case between two end positions determined by said third and said fourth sealing surfaces, a tube, said tube secured to one end of said valve member being provided with said second sealing surface and extending through said third section of said case and projecting over the end of said third section provided with said junction port, the outer diameter of said tube being less than the inner diameter of said third section, said valve member having a hollow space and passages at the end remote from the end secured to said tube, one end of the hollow space communicating with said tube and the other end of said hollow space communicating with said passages, said passages communicating with said first section.

2. A control valve according to claim 1, comprising furthermore a sleeve, said sleeve extending at least partly within said third section, the end of said sleeve adjacent said valve member constituting said fourth sealing surface.

3. A control valve according to claim 2, wherein the inner wall of said sleeve is provided with substantially radially extending lugs adapted to guide the outer surface of said tube.

4. A control valve according to claim 1, wherein said means for varying the position of said valve member comprises a bi-metal strip arrangement secured to said valve case, means to transform movements of said bi-metal strip in response to changes of the ambient temperature into corresponding axial movements of said valve member.

5. A control valve according to claim 4, wherein said bi-metal strip is spiraled, said spiral surrounding a bolt rotatably mounted within said valve case, the inner end of said spiral being secured to said bolt and the outer end of said spiral being secured to a pot-like case embracing said spiral and said bolt and being attached to said valve case.

6. A valve according to claim 5, wherein said valve member is provided with a peripheral groove and said means to transfer movement of said spiral is a lever provided with a pin, one end of said lever being connected to said bolt and the other end of said lever engaging said groove by means of said pin.

7. A control valve according to claim 5, comprising furthermore means to preadjust said spiral.

8. A control valve according to claim 7, wherein said pre-adjusting means is a lever and a pivotally mounted cam, said lever pivotally mounted at one end and the other end of said lever being secured to the outer end of said spiral, one side of said lever engaging the outer surface of said cam.

9. A control valve according to claim 8, comprising furthermore a sleeve of plastic material extending at least partly within said third section, the end of said sleeve adjacent said valve member constituting said fourth sealing surface and the inner wall of said sleeve being provided with at least three equidistantly spaced lugs extending in substantially radial direction and being adapted to guide said tube at its outer surface.

10. A control valve for a heat exchange system or the like comprising a valve case having a chamber with a first, a second and a third section, said case being provided with an inlet port, an outlet port, and a junction port, said inlet port communicating with said first section, said outlet port communicating with said second section and said junction port communicating with said third section and adapted to communicate with said heat exchange system, a valve member being axially movable with respect to the main axis of said case within said second section, said valve member being made of plastic material and having a hollow space, a tube, said tube being secured to one end of said valve member and extending through said third section of said case and projecting beyond the end of said third section, the outer diameter of said tube being smaller than the inner diameter of said surrounding third section, said tube being made of plastic material, guiding elements arranged in said valve casing to guide said tube, said guiding members made of plastic material, a thermostat device, means to transfer movement of said thermostat device due to temperature changes of the ambient air to said valve members, said valve member being provided with a first and a second sealing surface and said valve casing being provided with a third and a fourth sealing surface, said first and said second sealing surface corresponding with said third and said fourth sealing surface respectively, said valve member being provided with passages connecting said first section of said chamber with said hollow space of said valve member, said valve member in a first end position engaging its first sealing surface with said third sealing surface so that fluid entering said inlet travels through said first section, said passages, said hollow space, said tube, said heat exchange system, said third section and from there leaves the valve case through said outlet, said valve member engaging in a second end position its second sealing surface with said fourth sealing surface, so that water entering said inlet travels through said first section and through said second section around said valve member into said outlet, and from said first section also enters, without circulation through said passages into said hollow space, said tube, a heat exchange system and said third section of said case, the fluid thus acting with approximately the same pressure on both ends of said valve member.

References Cited by the Examiner

UNITED STATES PATENTS

| | | |
|---|---|---|
| 2,255,292 | 9/41 | Lincoln. |
| 2,836,197 | 5/58 | Johnson _____ 237—8 X |
| 2,941,821 | 6/60 | Klee _____ 137—599 X |

EDWARD J. MICHAEL, *Primary Examiner.*